US012670783B2

(12) United States Patent
Ni et al.

(10) Patent No.: US 12,670,783 B2
(45) Date of Patent: Jun. 30, 2026

(54) ELECTRONIC DEVICE

(71) Applicant: VIVO MOBILE COMMUNICATION CO., LTD., Dongguan (CN)

(72) Inventors: Peng Ni, Dongguan (CN); Hongchao Zhao, Dongguan (CN); Hongye Ci, Dongguan (CN); Yang Liu, Dongguan (CN); Xin Shan, Dongguan (CN); Chao Shen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 322 days.

(21) Appl. No.: 18/536,206

(22) Filed: Dec. 11, 2023

(65) Prior Publication Data

US 2024/0135803 A1 Apr. 25, 2024
US 2024/0233518 A9 Jul. 11, 2024

Related U.S. Application Data

(63) Continuation of application No. PCT/CN2022/098327, filed on Jun. 13, 2022.

(30) Foreign Application Priority Data

Jun. 17, 2021 (CN) ......................... 202110672736.3

(51) Int. Cl.
*G08C 23/04* (2006.01)

(52) U.S. Cl.
CPC .................................... *G08C 23/04* (2013.01)

(58) Field of Classification Search
CPC ...................................................... G08C 23/04

(Continued)

(56) References Cited

U.S. PATENT DOCUMENTS 11,099,062 B2 * 8/2021 Chen ..................... G01J 1/0233
2004/0156213 A1 * 8/2004 Lodhie .................... F21S 43/15
362/555

(Continued)

FOREIGN PATENT DOCUMENTS

CN 204884156 U 12/2015
CN 205318614 * 1/2016

(Continued)

OTHER PUBLICATIONS

International Search Report issued in corresponding International Application No. PCT/CN2022/098327, mailed Jul. 27, 2022, 4 pages.

(Continued)

*Primary Examiner* — Omar Casillashernandez
(74) *Attorney, Agent, or Firm* — IPX PLLC

(57) ABSTRACT

An electronic device is provided. The electronic device includes a housing, an infrared transmitter, a light guide member, and a decorative sheet. The infrared transmitter and the light guide member are both disposed in the housing. The housing is provided with a through hole, and at least a part of the light guide member is disposed in the through hole. The light guide member has a first end and a second end that are opposite to each other. The first end has a curved surface protruding opposite to the second end. The infrared transmitter is opposite to a light inlet surface, and the infrared transmitter emits infrared light toward the light inlet surface. The second end has a light outlet surface. At least a part of the infrared light incident in the light guide member through the light inlet surface emits on the light outlet surface.

18 Claims, 5 Drawing Sheets

(58) Field of Classification Search
USPC .......................................................... 341/176
See application file for complete search history.

(56) References Cited

U.S. PATENT DOCUMENTS

| | | | | |
|---|---|---|---|---|
| 2009/0305786 | A1* | 12/2009 | Chang ....................... | F21V 7/00 362/296.01 |
| 2014/0126193 | A1* | 5/2014 | Dixon ..................... | F21V 7/005 362/217.02 |
| 2014/0191255 | A1* | 7/2014 | Ghasemi Afshar .... | H05B 45/00 257/84 |
| 2023/0221601 | A1* | 7/2023 | Aoki ......................... | G09F 9/35 349/2 |
| 2024/0295749 | A1* | 9/2024 | Yamada ................. | G02B 30/60 |

FOREIGN PATENT DOCUMENTS

| | | | |
|---|---|---|---|
| CN | 205139410 | U | 4/2016 |
| CN | 205318614 | U | 6/2016 |
| CN | 206619272 | U | 11/2017 |
| CN | 108183998 | A | 6/2018 |
| CN | 108496210 | A | 9/2018 |
| CN | 109788096 | A | 5/2019 |
| CN | 109803078 | A | 5/2019 |
| CN | 113421416 | A | 9/2021 |
| CN | 113518138 | A | 10/2021 |
| JP | 2017228451 | A | 12/2017 |

OTHER PUBLICATIONS

First Office Action issued in related Chinese Application No. 202110672736.3, mailed Mar. 3, 2022, 9 pages.
Second Office Action issued in related Chinese Application No. 202110672736.3, mailed Oct. 10, 2022, 7 pages.

* cited by examiner

ELECTRONIC DEVICE

CROSS-REFERENCE TO RELATED APPLICATIONS

This application is a continuation of International Application No. PCT/CN2022/098327, filed Jun. 13, 2022, which claims priority to Chinese Patent Application No. 202110672736.3, filed Jun. 17, 2021. The entire contents of each of the above-referenced applications are expressly incorporated herein by reference.

TECHNICAL FIELD

The present application relates to the technical field of communications devices, and in particular to an electronic device.

BACKGROUND

At present, in infrared remote control, a through hole is usually provided at the top of an electronic device, and an infrared remote control light guide member is installed in the through hole. Such disposing has the following defects.

First, there is eccentricity between an infrared remote control component and the infrared remote control light guide member, and a quantity of infrared light emitted through a light outlet surface of the light guide member is small, affecting an effect of the infrared remote control.

Second, the light outlet surface of the light guide member is exposed, and is at risk of being scraped, affecting reliability of infrared remote control.

SUMMARY

The present application discloses an electronic device.

The present application provides an electronic device. The electronic device includes a housing, an infrared transmitter, a light guide member, and a decorative sheet. The infrared transmitter and the light guide member are both disposed in the housing, the housing is provided with a through hole, and at least a part of the light guide member is disposed in the through hole.

The light guide member has a first end and a second end that are opposite to each other. The first end has a light inlet surface, and the light inlet surface is a curved surface protruding opposite to the second end. The infrared transmitter is opposite to the light inlet surface, and the infrared transmitter emits infrared light toward the light inlet surface. The second end has a light outlet surface, and at least a part of the infrared light incident in the light guide member through the light inlet surface emits on the light outlet surface.

The decorative sheet is disposed in the housing, and is opposite to the light outlet surface. The decorative sheet has a light transmitting area, and infrared light penetrating the light guide member penetrates the housing through the light transmitting area.

Further, a light outlet recess corresponding to the light transmitting area is disposed on a side, opposite to the light guide member, of the decorative sheet.

Further, the housing is provided with an installation groove, the through hole penetrates a bottom wall of the installation groove, the decorative sheet is disposed in the installation groove and covers the through hole, and a side, facing the light guide member, of the decorative sheet is attached to the bottom wall of the installation groove.

Further, the light guide member includes a limiting portion, and the limiting portion is in limiting fit with the housing, to limit the light guide member in a penetrating-out direction of the through hole.

Further, the limiting portion is an annular protrusion structure, and the limiting portion is in limiting fit with a surface in which a port on an inner side of the through hole is located.

Further, the light guide member includes a protrusion. The protrusion is disposed between the first end and the second end, and the protrusion is located on a side, biased toward the infrared transmitter, of the light guide member. At least a part of the infrared light incident from a periphery of the light inlet surface is capable of penetrating the protrusion and emitting on the light outlet surface.

Further, the light guide member includes a first segment and a second segment. The first segment and the second segment are successively disposed in a light outlet direction of the light guide member, and the protrusion is disposed in the first segment and protrudes from the second segment, to enable the protrusion and the light guide member to form a stepped light guide member.

Further, a hole wall of the through hole has a stop portion, and the stop portion is in limiting fit with the protrusion.

Further, the housing includes a middle frame, a main board upper cover, and a sealing member. The main board upper cover is connected to the middle frame through the sealing member. The through hole is provided at the main board upper cover. The decorative sheet is disposed at the middle frame. The sealing member is disposed between the middle frame and the main board upper cover.

Further, the sealing member includes an annular sealing base and an annular sealing protrusion. The annular sealing protrusion is disposed on a side, facing the middle frame, of the annular sealing base, and the annular sealing protrusion is pressed against the middle frame.

According to the electronic device disclosed in the embodiments of the present application, the infrared transmitter emits infrared light toward the light guide member, and the light inlet surface converges the infrared light, to enable a quantity of infrared light emitted from the light outlet surface to increase. This reduces an impact caused by eccentricity between the infrared transmitter and the through hole, and ensures an effect of infrared remote control of the electronic device. In addition, the decorative sheet may protect the light outlet surface of the light guide member, to prevent the light outlet surface from being worn and scraped, further ensuring the effect of infrared remote control.

BRIEF DESCRIPTION OF DRAWINGS

To describe technical solutions in embodiments of the present application or in the prior art more clearly, the following briefly describes accompanying drawings. Apparently, the accompanying drawings in the following description show merely some embodiments of the present application, and a person of ordinary skill in the art may derive other drawings from these accompanying drawings without creative efforts.

Figure 1:
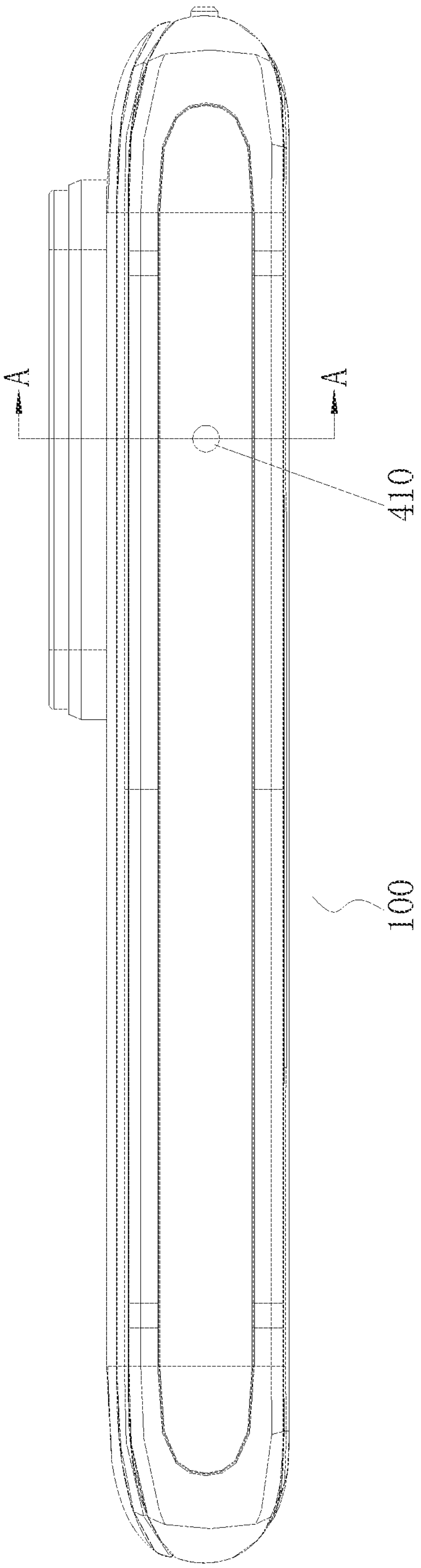
FIG. 1 is a schematic diagram of a structure of an electronic device according to a first embodiment of the present application.
Figure 2:
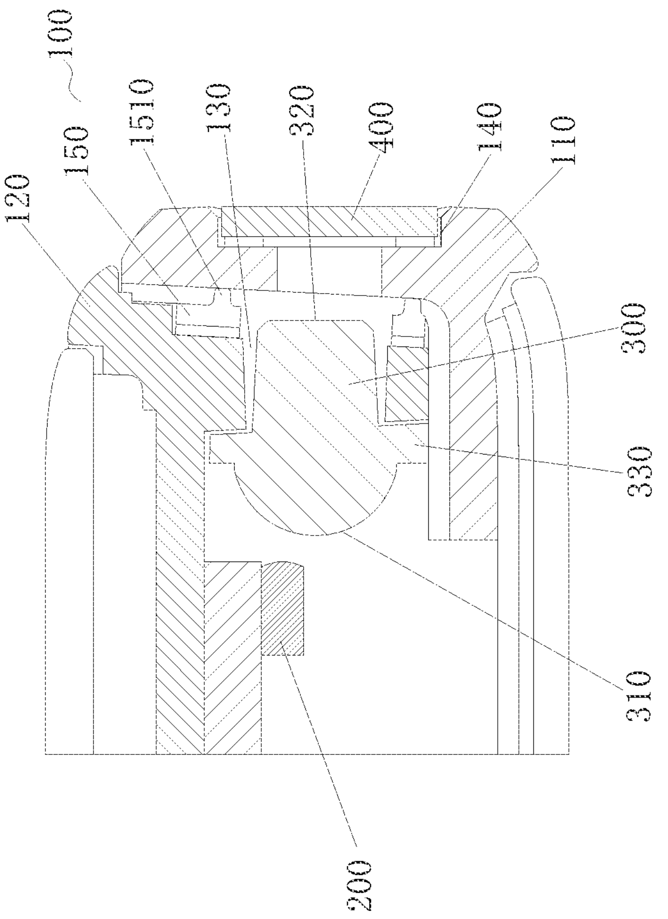
FIG. 2 is a sectional view taken in a direction A-An of FIG. 1.
Figure 3:
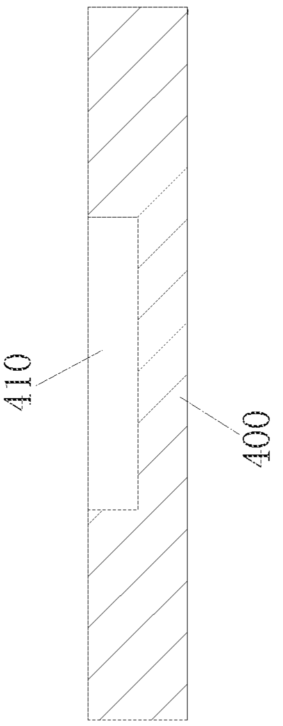
FIG. 3 is a sectional view of a decorative sheet according to a first embodiment of the present application.
Figure 4:
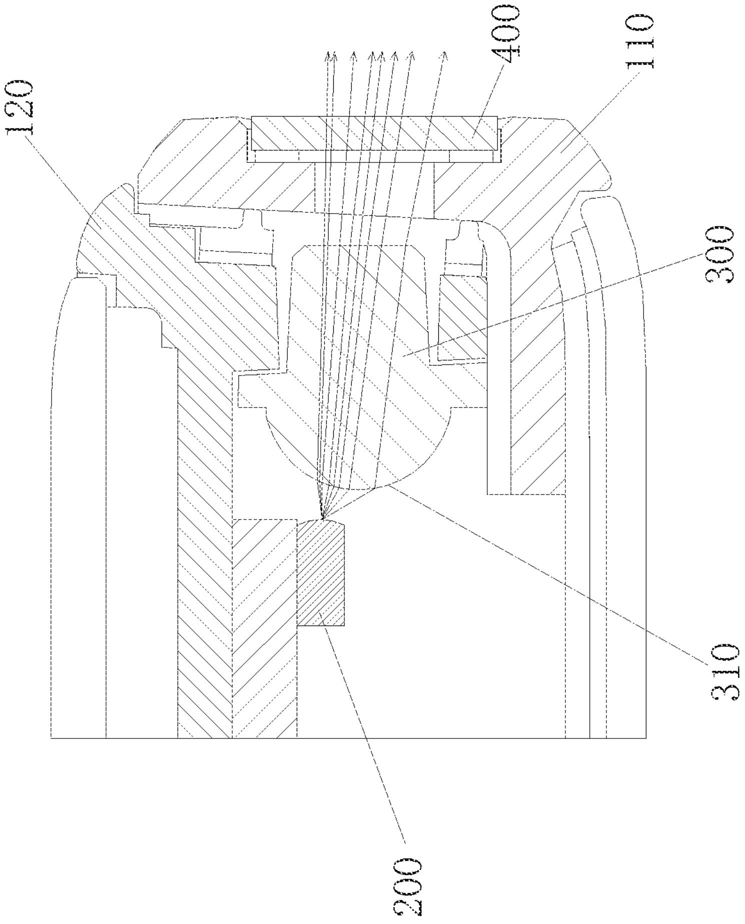
FIG. 4 is a schematic diagram of a light path of an electronic device according to a first embodiment of the present application.
Figure 5:
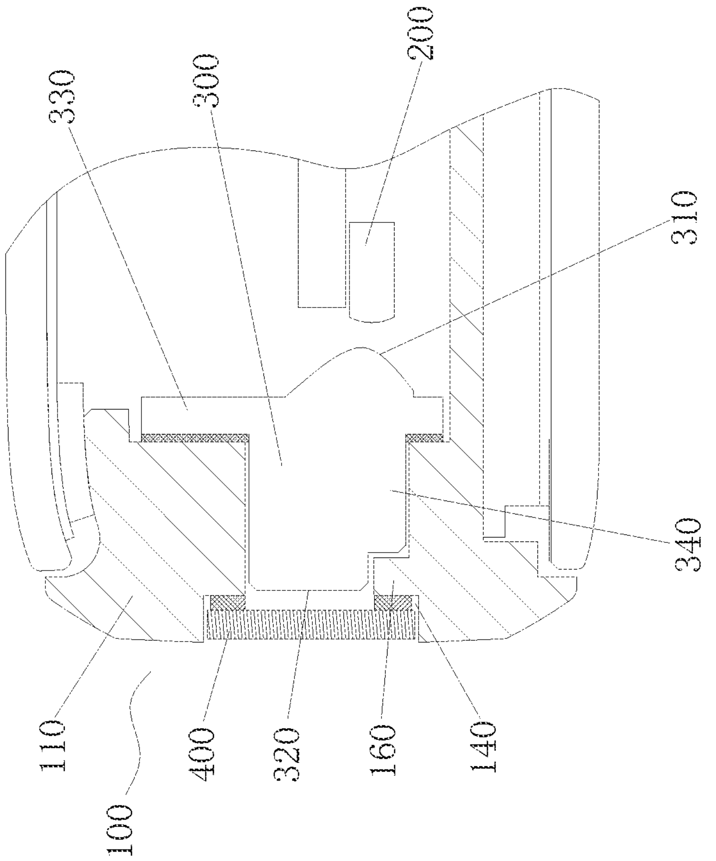
FIG. 5 is a schematic diagram of a structure of an electronic device according to a second embodiment of the present application.

Reference numerals in the accompanying drawings are as follows.

100—housing, 110—middle frame, 120—main board upper cover, 130—through hole,

140—installation groove, 150—annular sealing base, 1510—annular sealing protrusion, 160—stop portion;

200—infrared transmitter;

300—light guide member, 310—light inlet surface. 320—light outlet surface, 330—limiting portion. 340—protrusion;

400—decorative sheet, 410—light outlet recess.

DETAILED DESCRIPTION

To make objectives, technical solutions, and advantages of the present application more clear, technical solutions of the present application are described in detail below. Apparently, the described embodiments are merely a part rather than all of the embodiments of the present application. All other implementations obtained by a person of ordinary skill in the art based on the embodiments of the present application without creative efforts shall fall within the protection scope of the present application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to FIG. 1 to FIG. 6, an electronic device provided in the embodiments of this application is described in detail by using embodiments and application scenarios of the embodiments.

An embodiment of the present application discloses an electronic device. The disclosed electronic device includes a housing 100, an infrared transmitter 200, a light guide member 300, and a decorative sheet 400. The housing 100 is a basic member of the electronic device, and the housing 100 can provide an installation basis for other components of the electronic device. In addition, the housing 100 can protect other electronic components in the electronic device. The infrared transmitter 200 and the light guide member 300 are both disposed in the housing 100.

In some embodiments, the housing 100 is provided with a through hole 130, and at least a part of the light guide member 300 is disposed in the through hole 130. The infrared transmitter 200 is located in the housing 100 and transmits infrared light toward the light guide member 300. At least a part of the infrared light incident on the light guide member 300 can penetrate the light guide member 300 and emit outside the housing 100.

The light guide member 300 has a first end and a second end that are opposite to each other. The first end has a light inlet surface 310. The light inlet surface 310 is a curved surface protruding opposite to the second end. The infrared transmitter 200 is opposite to the light inlet surface 310, and the infrared transmitter 200 emits infrared light toward the light inlet surface 310. The second end has a light outlet surface 320. At least a part of the infrared light incident in the light guide member 300 through the light inlet surface 310 emits on the light outlet surface 320.

The light guide member 300 functions as a convex lens to converge light on the light inlet surface 310, to enable the infrared light transmitted by the infrared transmitter 200 on the light inlet surface 310 to change a path and refract and converge toward an axial direction of the through hole 130. Therefore, at least a part of the infrared light that falls outside the through hole 130 in an incidence area can emit on the light outlet surface 320 after being refracted and converged through the light inlet surface 310, and a quantity of infrared light emitted from the light outlet surface 320 is increased. Although there is eccentricity between the infrared transmitter 200 and the through hole 130, a quantity of emitted infrared light increases, reducing an impact caused by the eccentricity between the infrared transmitter 200 and the through hole 130, and ensuring an effect of infrared remote control.

When the light outlet surface 320 of the light guide member 300 is exposed, the light outlet surface 320 is at risk of being worn and scraped. After the electronic device is used for a period of time, the light outlet surface 320 that is scraped changes a path of emitted infrared light, reducing reliability of performance of infrared remote control, and the light guide member 300 may not be easily replaced to resolve the defect. Based on this, the decorative sheet 400 is disposed at the housing 100 and is opposite to the light outlet surface 320. The decorative sheet 400 has a light transmitting area. When the electronic device is used, infrared light penetrating the light guide member 300 penetrates the housing 100 through the light transmitting area. Therefore, the decorative sheet 400 does not affect normal use of the infrared remote control function of the electronic device. In addition, the decorative sheet 400 may protect the light outlet surface 320 of the light guide member 300, to prevent the light outlet surface 320 from being worn and scraped.

Further, to prevent scrapping in the light transmitting area of the decorative sheet 400, which affects performance of infrared remote control, a light outlet recess 410 corresponding to the light transmitting area is disposed on a side, opposite to the light guide member 300, of the decorative sheet 400. When the infrared light penetrates the decorative sheet 400, the infrared light emits out of the housing 100 from a bottom wall of the light outlet recess 410, and the electronic device does not wear out of the bottom wall of the light outlet recess 410 in daily use. This prevents the bottom wall of the light outlet recess 410 from being scraped and ensures the performance of infrared remote control of the electronic device.

In an embodiment, the housing 100 is provided with an installation groove 140, the through hole 130 penetrates a bottom wall of the installation groove 140, the decorative sheet 400 is disposed in the installation groove 140 and covers the through hole 130, one side, toward the light guide member 300, of the decorative sheet 400 is attached to the bottom wall of the installation groove 140, and the other side of the decorative sheet 400 is flush with a surface of the housing 100, so that an appearance of the electronic device is beautiful without a sense of incongruity.

In an embodiment, the installation groove 140 has an installation portion around the through hole 130. The installation portion is located on the bottom wall of the installation groove 140. The decorative sheet 400 is attached to the installation portion. Further, the decorative sheet 400 is attached to the installation portion by using double-sided tape. Of course, the decorative sheet 400 may be disposed in the installation groove 140 in a clamping manner. A manner in which the decorative sheet 400 is connected to the housing 100 is not limited in this embodiment of the present application.

The light guide member 300 includes a limiting portion 330. The limiting portion 330 is in limiting fit with the housing 100, to limit the light guide member 300 in a penetrating-out direction of the through hole 130, and prevent the light guide member 300 from slipping out of the through hole 130.

In an embodiment, the limiting portion 330 is an annular protrusion structure, and the limiting portion 330 is in limiting fit with a surface in which a port on an inner side of the through hole 130 is located.

The limiting portion 330 may be an annular light guide protrusion. The annular light guide protrusion surrounds the light inlet surface 310, and the annular light guide protrusion may further receive infrared light in a larger range and guide the infrared light to the light outlet surface 320. In this case, the limiting portion 330 may not only limit the light guide member 300, but also guide more infrared light to the light outlet surface 320, to achieve a plurality of functions.

Further, the limiting portion 330 is attached to a surface of the port on an inner side of the through hole 130, to fasten the light guide member 300, prevent the light guide member 300 from shaking and affecting reliability of the performance of infrared remote control.

In another embodiment, the limiting portion 330 may be in limiting fit with a hole wall of the through hole 130.

In some embodiments, the limiting portion 330 may be a protrusion structure disposed on the light guide member 300. The protrusion structure is located in the through hole 130, an inner wall of the through hole 130 has a stop portion protruding out of the inner wall. The stop portion is corresponding to the protrusion structure. In a penetrating-out direction in the through hole 130, the light guide member 300 is clamped to the through hole 130 by limiting fit of the protrusion structure with the stop portion.

In a case of ultimate space stacking in the electronic device, eccentricity between the infrared transmitter 200 and the through hole 130 is more obvious. In the prior art, a shelf plate or a padding plate is usually used to improve the eccentricity. However, a solution in which the shelf plate or padding plate is used needs to occupy larger space than a component, and a surrounding component is to be avoided. Therefore, in the prior art, space for main board layout and space for stacking are to be large, and a component and a process are to be increased, increasing overall costs. Based on this, refer to FIG. 5 and FIG. 6. The light guide member 300 further includes a protrusion 340. The protrusion 340 is disposed between the first end and the second end. The protrusion 340 is located on a side, biased toward the infrared transmitter 200, of the light guide member 30). At least a part of infrared light incident on a periphery of the light inlet surface 310 may penetrate the protrusion 340 and emit on the light outlet surface 320, to guide the infrared light to the light outlet surface 320 as much as possible.

Figure 6:
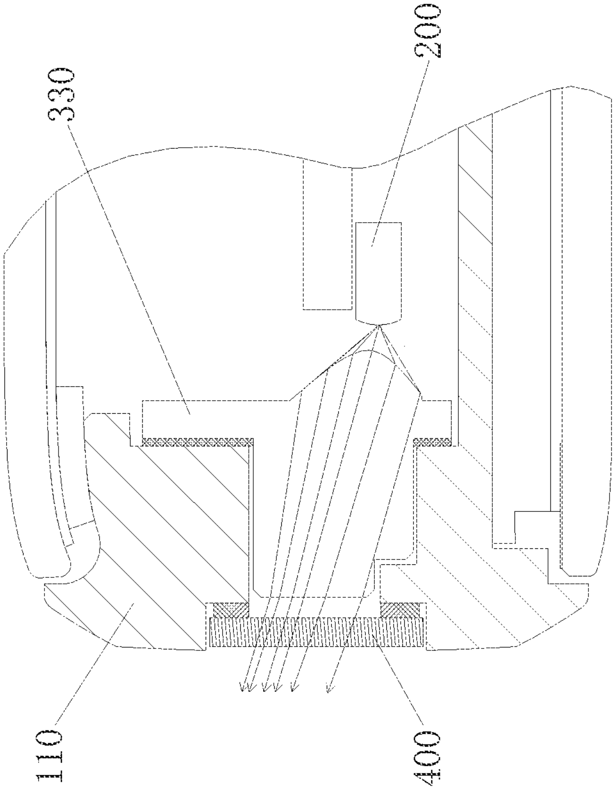
FIG. 6 is a schematic diagram of a light path of an electronic device according to second embodiment of the present application.

Refer to FIG. 6. The infrared light incident on the periphery of the light inlet surface 310, especially a part of the infrared light that deviates from an axial direction of the through hole 130, is refracted on the light inlet surface 310 and converges toward the axial direction of the through hole 130. The protrusion 340 enables the part of the infrared light to be guided in a collimated manner to the light outlet surface 320 within a light guide member 300 and emit from the light outlet surface 320, and the protrusion 340 enables the infrared light to be transmitted to the light outlet surface 320 as much as possible. This increases a quantity of infrared light emitted on the light outlet surface 320, ensures performance of infrared remote control, and reduces an impact caused by eccentricity between the through hole 130 and the infrared transmitter 200.

In an embodiment, the light guide member 300 includes a first segment and a second segment. In a light outlet direction of the light guide member 300, the first segment and the second segment are successively disposed. The protrusion 340 is disposed in the first segment and protrudes out of the second segment. The protrusion 340 forms a stepped surface on a side biased toward the infrared transmitter 200, and the protrusion 340 and the light guide member 300 form a stepped light guide member. In a case of ultimate space stacking in the electronic device, the use of the stepped light guide member can ensure reliability of the performance of infrared remote control without an additional component or process. This enables an infrared functional component of the electronic device to occupy less stack space and increases space utilization of the whole device.

In another embodiment, the protrusion 340 may form, on a side biased toward the infrared transmitter 200, an oblique plane or an arc plane protruding toward a hole wall of the through hole 130. This enables at least a part of the infrared light to penetrate the protrusion 340 and emit from the light outlet surface 320. A specific structure of the protrusion 340 is not limited in this embodiment of the present application.

Further, the hole wall of the through hole 130 has a stop portion 160, and the protrusion 340 is in limiting fit with the stop portion 160 to limit the light guide member 300 in a penetrating-out direction of the through hole 130 and prevent the light guide member 300 from slipping out of the through hole 130.

In an embodiment, the housing 100 includes a middle frame 110, a main board upper cover 120, and a sealing member. The main board upper cover 120 is connected to the middle frame 110 through the sealing member. The main board upper cover 120 is a basic structural member, and may provide an installation basis for the middle frame 110, the sealing member, and the light guide member 300. In some embodiments, the middle frame 110 may be connected to the main board upper cover 120 by buckling, screwing, bonding, or the like. The through hole 130 is provided at the main board upper cover 120, and an installation groove 140 is provided at the middle frame 110, to enable a decorative sheet 400 to be disposed at the middle frame 110. The sealing member is disposed between the middle frame 110 and the main board upper cover 120 to achieve a dust-proof and waterproof sealing effect.

In an embodiment, the sealing member may be a sealing ring, such as a commonly used rubber sealing ring or silicone sealing ring.

In another embodiment, the sealing member includes an annular sealing base 150 and an annular sealing protrusion 1510. The annular sealing base 150 surrounds the through hole 130. The annular sealing protrusion 1510 is disposed on a side, toward the middle frame 110, of the annular sealing base 150. The annular sealing base 150 and the annular sealing protrusion 1510 are both elastic structural members, such as structural members made of rubber or silicone material. When the middle frame 110 is connected to the main board upper cover 120, the annular sealing protrusion 1510 is tightly pressed against the middle frame 110, enhancing sealing performance of connection between the middle frame 110 and the main board upper cover 120, and making it difficult for dust or water mist to enter the housing 100.

In another embodiment, the housing includes a middle frame 110. The middle frame 110 is a basic structural member and may provide an installation basis for the light guide member 300 and the decorative sheet 400. The through hole 130 and the installation groove 140 are both provided at the middle frame 110, at least a part of the light guide member 300 is located in the through hole 130, and the decorative sheet 400 is disposed in the installation groove 140.

To sum up, the embodiments of the present application have the following technical effects.

First, the protruding light inlet surface 310 enables the light guide member 300 to function as the convex lens to converge light. This enables the infrared light emitted by the infrared transmitter 200 to refract on the light inlet surface 310 and converge toward the axial direction of the through hole 130, increasing the quantity of infrared light emitted by the light outlet surface 320, reducing the impact caused by the eccentricity between the infrared transmitter 200 and the through hole 130, and ensuring the effect of infrared remote control.

Second, the decorative sheet 4(*x*) with the light transmitting area is provided at the housing 100, to enable the light outlet surface 320 to be hidden inside the decorative sheet 400, preventing the light outlet surface 320 from being worn.

Third, the light outlet recess 410 is disposed on a side, opposite to the light guide member 300, of the decorative sheet 400, to prevent the light transmitting area of the decorative sheet 400 from being worn and ensure the performance of infrared remote control.

Fourth, under the condition of large eccentricity, the protrusion 340 may guide the infrared light incident from the periphery of the light inlet surface 310 to the light outlet surface 320 as much as possible. This can still ensure the performance of infrared remote control of the electronic device without an additional component or process, enabling infrared functional components of the electronic device to occupy less stacking space as a whole, and increasing space utilization of the whole device.

It should be noted that, in this specification, the terms "include". "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the implementations of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

The foregoing descriptions are merely implementations of the present application, but are not intended to limit the protection scope of the present application. Any variation or replacement readily figured out by a person skilled in the art within the technical scope disclosed in the present application shall fall within the protection scope of the present application.

The invention claimed is:

1. An electronic device, comprising:

a housing;

an infrared transmitter;

a light guide member; and a decorative sheet, wherein:

the infrared transmitter and the light guide member are both disposed in the housing, the housing is provided with a through hole, and at least a part of the light guide member is disposed in the through hole;

the light guide member has a first end and a second end that are opposite to each other, the first end has a light inlet surface, the light inlet surface is a curved surface protruding opposite to the second end, the infrared transmitter is opposite to the light inlet surface, the infrared transmitter emits infrared light toward the light inlet surface, the second end has a light outlet surface, and at least a part of the infrared light incident in the light guide member through the light inlet surface emits on the light outlet surface;

the decorative sheet is disposed in the housing, and is opposite to the light outlet surface, the decorative sheet has a light transmitting area, and infrared light penetrating the light guide member penetrates the housing through the light transmitting area; and the housing is provided with an installation groove, the through hole penetrates a bottom wall of the installation groove, the decorative sheet is disposed in the installation groove and covers the through hole, and a side, facing the light guide member, of the decorative sheet is attached to the bottom wall of the installation groove.

2. The electronic device according to claim 1, wherein a light outlet recess corresponding to the light transmitting area is disposed on a side, opposite to the light guide member, of the decorative sheet.

3. The electronic device according to claim 1, wherein the light guide member comprises a limiting portion, and the limiting portion is in limiting fit with the housing, to limit the light guide member in a penetrating-out direction of the through hole.

4. The electronic device according to claim 3, wherein the limiting portion is an annular protrusion structure, and the limiting portion is in limiting fit with a surface in which a port on an inner side of the through hole is located.

5. The electronic device according to claim 1, wherein the light guide member comprises a protrusion, the protrusion is disposed between the first end and the second end, the protrusion is located on a side, biased toward the infrared transmitter, of the light guide member, and at least a part of the infrared light incident from a periphery of the light inlet surface is configured to penetrate the protrusion and emitting on the light outlet surface.

6. The electronic device according to claim 5, wherein the light guide member comprises a first segment and a second segment, the first segment and the second segment are successively disposed in a light outlet direction of the light guide member, and the protrusion is disposed in the first segment and protrudes from the second segment, to enable the protrusion and the light guide member to form a stepped light guide member.

7. The electronic device according to claim 6, wherein a hole wall of the through hole has a stop portion, and the stop portion is in limiting fit with the protrusion.

8. The electronic device according to claim 1, wherein the housing comprises a middle frame, a main board upper cover, and a sealing member, the main board upper cover is connected to the middle frame through the sealing member, the through hole is provided at the main board upper cover, and the decorative sheet is disposed at the middle frame.

9. The electronic device according to claim 8, wherein the sealing member comprises an annular sealing base and an annular sealing protrusion, the annular sealing protrusion is disposed on a side, facing the middle frame, of the annular sealing base, and the annular sealing protrusion is pressed against the middle frame.

10. An electronic device, comprising:

a housing;

an infrared transmitter;

a light guide member; and a decorative sheet, wherein:

the infrared transmitter and the light guide member are both disposed in the housing, the housing is provided with a through hole, the infrared transmitter is eccentrically disposed with respect to the through hole, and at least a part of the light guide member is disposed in the through hole;

the light guide member has a first end and a second end that are opposite to each other, the first end has a light inlet surface, the light inlet surface is a curved surface protruding opposite to the second end, the infrared transmitter is opposite to the light inlet surface, the infrared transmitter emits infrared light toward the light inlet surface, the second end has a light outlet surface, and at least a part of the infrared light incident in the light guide member through the light inlet surface emits on the light outlet surface;

the decorative sheet is disposed in the housing, and is opposite to the light outlet surface, the decorative sheet has a light transmitting area, and infrared light penetrating the light guide member penetrates the housing through the light transmitting area; and the housing is provided with an installation groove, the through hole penetrates a bottom wall of the installation groove, the decorative sheet is disposed in the installation groove and covers the through hole, and a side, facing the light guide member, of the decorative sheet is attached to the bottom wall of the installation groove.

11. The electronic device according to claim 10, wherein a light outlet recess corresponding to the light transmitting area is disposed on a side, opposite to the light guide member, of the decorative sheet.

12. The electronic device according to claim 10, wherein the light guide member comprises a limiting portion, and the limiting portion is in limiting fit with the housing, to limit the light guide member in a penetrating-out direction of the through hole.

13. The electronic device according to claim 12, wherein the limiting portion is an annular protrusion structure, and the limiting portion is in limiting fit with a surface in which a port on an inner side of the through hole is located.

14. The electronic device according to claim 10, wherein the light guide member comprises a protrusion, the protrusion is disposed between the first end and the second end, the protrusion is located on a side, biased toward the infrared transmitter, of the light guide member, and at least a part of the infrared light incident from a periphery of the light inlet surface is configured to penetrate the protrusion and emitting on the light outlet surface.

15. The electronic device according to claim 14, wherein the light guide member comprises a first segment and a second segment, the first segment and the second segment are successively disposed in a light outlet direction of the light guide member, and the protrusion is disposed in the first segment and protrudes from the second segment, to enable the protrusion and the light guide member to form a stepped light guide member.

16. The electronic device according to claim 15, wherein a hole wall of the through hole has a stop portion, and the stop portion is in limiting fit with the protrusion.

17. The electronic device according to claim 10, wherein the housing comprises a middle frame, a main board upper cover, and a sealing member, the main board upper cover is connected to the middle frame through the sealing member, the through hole is provided at the main board upper cover, and the decorative sheet is disposed at the middle frame.

18. The electronic device according to claim 17, wherein the sealing member comprises an annular sealing base and an annular sealing protrusion, the annular sealing protrusion is disposed on a side, facing the middle frame, of the annular sealing base, and the annular sealing protrusion is pressed against the middle frame.

* * * * *